May 19, 1970     W. G. HODLEWSKY ET AL     3,512,627
LATERALLY FLEXIBLE FLAT TOP CONVEYOR WITH METAL
U-SHAPED GUIDE CONTACTING MEMBER WELDED
TO THE BOTTOM OF THE LINKS
Filed Dec. 18, 1967
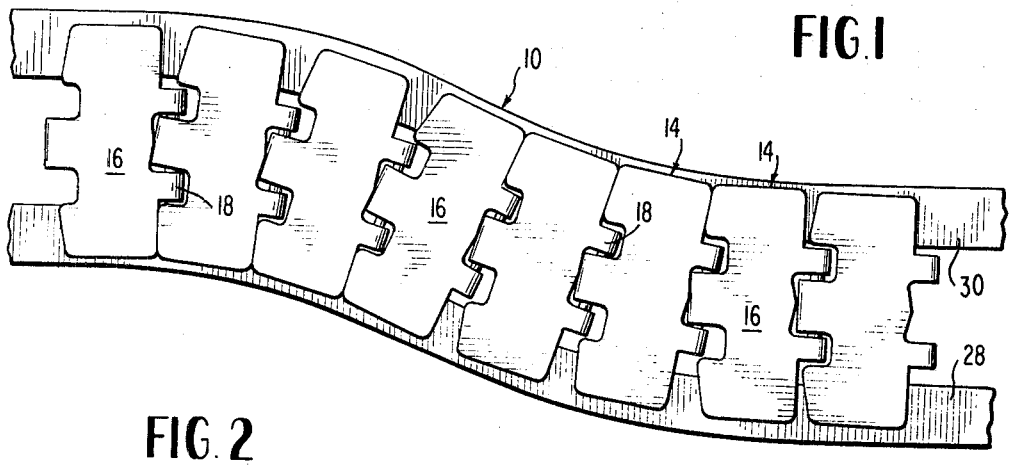
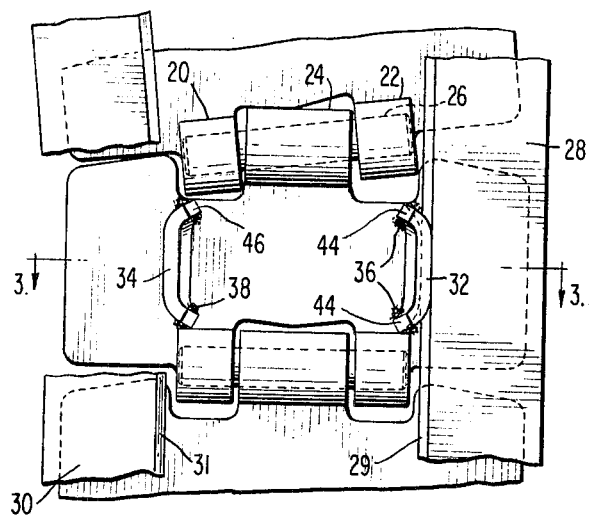
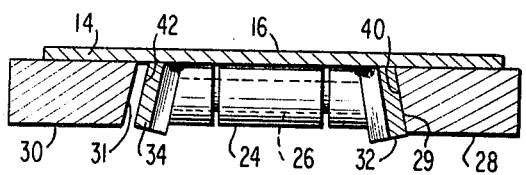
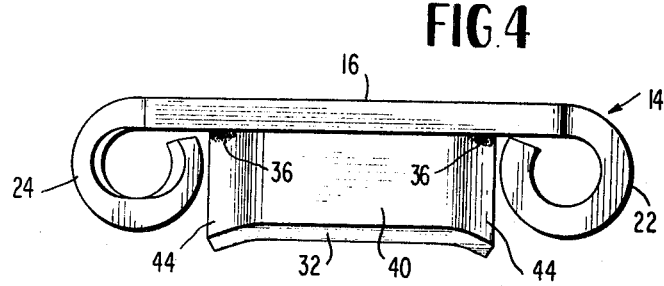
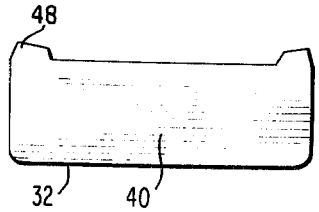
INVENTORS
WASYLY G. HODLEWSKY
PHILIP J. IMSE
BY Sughrue, Rothwell, Mion,
Zinn & Macpeak
ATTORNEYS

3,512,627
LATERALLY FLEXIBLE FLAT TOP CONVEYOR WITH METAL U-SHAPED GUIDE CONTACTING MEMBER WELDED TO THE BOTTOM OF THE LINKS

Wasyly G. Hodlewsky, Greendale, and Philip J. Imse, Wauwatosa, Wis., assignors to Rex Chainbelt Inc., Milwaukee, Wis., a corporation of Wisconsin
Filed Dec. 18, 1967, Ser. No. 691,282
Int. Cl. B65g 17/00
U.S. Cl. 198—189                         3 Claims

ABSTRACT OF THE DISCLOSURE

A laterally flexible flat top conveyor usable with curved stationary guides has metal C-shaped guide contacting members welded to the bottom surface of each link at an angle so that the bottom of the C-shaped guide contacing members cooperates smoothly with the stationary guides.

BACKGROUND OF THE INVENTION

Field of the invention

This invention relates to improvements in conveyors and particularly to laterally flexible flat top conveyors having a plurality of pivotally connected metal links which are guided by stationary guides.

Prior art

Laterally flexible flat top conveyors having links which are pivotally connected to one another by hinge pins extending through knuckles in adjacent conveyor links are known in the art. It is also known to provide a stationary guide which is curved to a desired path for guiding the laterally flexible conveyor and which has an inclined guide edge which cooperates with guide contacting means on the conveyor for the purpose of holding the conveyor in a horizontal plane as well as laterally guiding it while in the horizontal plane. In the prior art such guide contacting means on the conveyor links have been the ends of the knuckles themselves, which do not have a smooth surface for the stationary guide to run against. The difficulty with such construction is that dirt and foreign matter will accumulate between the guide contacting means on the link and the stationary guide to interfere with efficient guiding operation. The stationary guide will also place undue stress on the guide contacting means when these contacting means also serve a double purpose of being a knuckle for ahinge pin. Furthermore, if the prior art constructions were formed of metal, the lack of smooth surfaces would intensify any guide problem since rough or discontinuous cooperating guide surfaces running together would quickly wear, cause noise, and attendant undesirable problems.

SUMMARY OF INVENTION

In this invention a metal guide contacting member is C-shaped and the side of the C-shaped member is welded to the bottom surface of each metal link at an angle so that the bottom of the C-shaped member smoothly contacts an inclined surface of a curved stationary guide. The C-shaped metal members are separate from the knuckles of the link and hence no guiding forces are transferred directly to the knuckles. Furthermore, the guide contacting members being metal are smooth enough to run against plastic support rails as well as metal rails, thus contributing to a greater flexibility and the possible use of the conveyors with various types of rails. The smooth surface contact due to the C-shape of the guide eliminates the possibility of foreign material accumulating and provides for trouble-free operation. The C-shape also makes possible the use of laterally offset welds which more reliably connect the guides to the underside of each link.

BRIEF DESCRIPTION OF DRAWING

FIG. 1 is a top plan view in a reduced scale of a conveyor incorporating the improved guiding arrangement of this invention.

FIG. 2 is a bottom plan view of a portion of the conveyor.

FIG. 3 is a sectional view transversely of the conveyor at line 3—3 of FIG. 2 to show a link of the conveyor chain in front elevation.

FIG. 4 is an enlarged side elevation view of one link of the conveyor chain.

FIG. 5 is a plan view of the metal blank from which a C-shaped guide member is formed.

DESCRIPTION OF PREFERRED EMBODIMENT

Referring to the drawing, a conveyor 10 is of the laterally flexible flat top type that is commonly used for conveying bottles and containers of various types in industrial plants, such as food and liquid handling, bottling and packaging plants. The conveyor is formed of a plurality of serially-arranged links 14 having flat tops 16 presenting a surface for carrying the containers. Pivotal connections 18 are provided between each link and arranged to allow the links to laterally flex. These connections may be of a type known in the art, including spaced knuckles 20 and 22 on one side of the flat top of each link and a center knuckle 24 on the other side of the flat top of each link, the center knuckle of one link mating between the spaced knuckles of an adjacent link and hingedly connected thereto by a pin 26.

Conveyors of this type are moved about curved paths while being guided by stationary guide members, such as rails 28 and 30. These rails have inclined guide surfaces 29 and 31, respectively, for holding the conveyor 10 in a horizontal plane as well as guiding it in a curved path while in a horizontal plane.

This invention relates to improvements in guide contacting means carried by the conveyor links 14. These guide contacting means for each link 14 include a pair of C-shaped metal members 32 and 34 which are connected by welds or weldments 36 and 38, respectively, to the bottom surface of the link. The C-shaped metal members are equally spaced on the sides of the longitudinal center line or axis of the conveyor and have flat, outside guide surfaces 40 and 42 formed by the center sections of the members. The members 32 and 34 are disposed so that they form an acute angle between the guide surfaces 40 and 42 and the bottom surface of link 14. The ends 44 and 46 of the metal members are curved toward the center of the link to provide smooth approach surfaces as the guide surfaces slide over the guide surfaces 29 and 31 of rails 28 and 30. Members 32 and 34 are symmetrical so that the conveyor can operate in either direction.

By forming the guide members of metal with the C-shape, the members may be secured to the links with welds which are laterally offset at least somewhat respecting the centerline of the chain.

That is, welds 36 and 38 are located at the ends of the guide members 32 and 34 and thus nearer the centerline of the chain relative to the upper corner between the underside of link 14 and the guide surface 40. Thus, in welding to the underside of the link there is no possibility that the welds will interfere with the operation of the guide members on the guide rails. That is, no welds of any kind can be allowed to project into the corners between surfaces 40 and 42 and the underside of the link because they would bear against the rails 28 and 30. The use of welds is made possible by the C-shape of the guide members and locating the welds at the ends of the members which also provide the approach surfaces mentioned. The metal for the welds is most conveniently provided by the projections 48 formed integrally with the blank as shown in FIG. 5 from which member 32 is formed. Members 32 and 34 may be simultaneously held in position and projection welded to the link by heating with a high electric current in a known manner.

In the completed link, members 32 and 34 are unconnected and are not connected or joined with knuckles 20, 22 and 24. As may be seen, the underside of the link is thus free of corners in which dirt or material can collect and can be cleaned with a spray of hot water or steam which will wash over the entire underside of the link.

What is claimed is:

1. A laterally flexible flat top conveyor assembly of the type including a conveyor with a plurality of pivotally connected serially arranged flat top metal links, each link including guide contacting means below the top surface thereof, and a stationary member for guiding the conveyor in a curved path while retaining it in a horizontal plane by the guide contacting means on the link physically contacting an inclined surface on the stationary guide members, with the improvements in the guide contacting means comprising: a separate metal member with a C-shaped outer surface for contacting the guide member, a securing means rigidly securing a side edge of the metal member to the bottom of each link so that the member is separated and spaced from the pivotal connection of each link and with a central portion of the C-shaped outer surface of the metal member forming a guide surface extending generally parallel to and outwardly of the longitudinal axis of the conveyor, the securing means positioned remote from the guiding surface of the metal member and also extending at an acute angle to the bottom surface of each link, the legs of the C-shaped member extending toward the longitudinal axis of the conveyor.

2. A conveyor as in claim 1 wherein each link has a pair of the metal members each welded thereto with the bottom of the members equally spaced from a longitudinal axis of the conveyor and the C-shaped outer surface facing outward, the securing means are welds at opposite ends of the metal members.

3. A laterally flexible flat top conveyor including a chain with a plurality connected serially arranged flat top metal links, each link including guide contacting means below the top surface thereof, and a stationary member for guiding the conveyor in a curved path while retaining it in a horizontal plane by the guide contacting means on the link physically contacting an inclined surface on the stationary guide member, the guide contacting means for each link comprising a pair of separate metal member having a C-shaped outer surface for contacting the stationary guide member, weldments securing the ends of the member to the bottom of the link so that the member is separated and spaced from the pivotal connections of the link, an outer side of the central section of the C-shaped outer surface of each metal member opposite the longitudinal axis of the conveyor forming a pair of guide surfaces extending generally parallel to the longitudinal axis of the conveyor and also extending at an acute angle to the bottom surface of the link, the ends of metal member and said weldments being relatively disposed nearer the longitudinal axis of the conveyor.

References Cited
UNITED STATES PATENTS

| | | | |
|---|---|---|---|
| 3,279,586 | 10/1966 | Kampfer | 198—189 |
| 3,262,550 | 7/1966 | Kampfer | 198—195 |

EDWARD A. SROKA, Primary Examiner

U.S. Cl. X.R.

198—189

UNITED STATES PATENT OFFICE
CERTIFICATE OF CORRECTION

Patent No. 3,512,627   Dated May 19, 1970

Inventor(s) Wasyly G. Hodlewsky and Philip J. Imse

It is certified that error appears in the above-identified patent and that said Letters Patent are hereby corrected as shown below:

Column 1, line 19 - "tacing" should be "tacting"

Column 1, line 51 - there should be a space after "a" and before "hinge"

Column 4, line 8 - after "plurality" insert "of pivotally"

SIGNED AND
SEALED
DEC 15 1970

(SEAL)
Attest:

Edward M. Fletcher, Jr.
Attesting Officer

WILLIAM E. SCHUYLER, JR.
Commissioner of Patents